(12) United States Patent
Koga et al.

(10) Patent No.: US 11,628,520 B2
(45) Date of Patent: Apr. 18, 2023

(54) PREFORM SOLDER AND METHOD OF MANUFACTURING THE SAME, AND METHOD OF MANUFACTURING SOLDER JOINT

(71) Applicant: Senju Metal Industry Co., Ltd., Tokyo (JP)

(72) Inventors: Shunsuke Koga, Tokyo (JP); Tomoki Sasaki, Tokyo (JP); Yoshie Tachibana, Tokyo (JP); Shunsaku Yoshikawa, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 17/706,965

(22) Filed: Mar. 29, 2022

(65) Prior Publication Data

US 2022/0324062 A1    Oct. 13, 2022

(30) Foreign Application Priority Data

Mar. 31, 2021 (JP) .............................. JP2021-059319

(51) Int. Cl.
| | |
|---|---|
| B23K 35/26 | (2006.01) |
| B23K 35/02 | (2006.01) |
| B23K 35/30 | (2006.01) |
| C22C 13/00 | (2006.01) |
| C22C 19/03 | (2006.01) |

(52) U.S. Cl.
CPC ........ *B23K 35/262* (2013.01); *B23K 35/0233* (2013.01); *B23K 35/3033* (2013.01); *C22C 13/00* (2013.01); *C22C 19/03* (2013.01)

(58) Field of Classification Search
None
See application file for complete search history.

(56) References Cited

U.S. PATENT DOCUMENTS

| | | | |
|---|---|---|---|
| 10,362,686 B2 * | 7/2019 | Yasui ................ | B23K 35/0244 |
| 2005/0029666 A1 | 2/2005 | Kurihara et al. | |
| 2016/0008930 A1 | 1/2016 | Yasui et al. | |
| 2016/0121434 A1 | 5/2016 | Yasui et al. | |

(Continued)

FOREIGN PATENT DOCUMENTS

| | | |
|---|---|---|
| DE | 10-2018-126509 | 4/2019 |
| JP | 2002-254194 | 9/2002 |

(Continued)

OTHER PUBLICATIONS

Japanese Notice of Reasons for Rejection for Application No. 2021-059319, dated Jul. 6, 2021, (11 pages).

(Continued)

*Primary Examiner* — Daniel J. Schleis
(74) *Attorney, Agent, or Firm* — Nixon Peabody LLP; Jeffrey L. Costellia

(57) ABSTRACT

Provided is a preform solder including a first metal containing Sn and a second metal formed of an alloy containing Ni and Fe. Alternatively, provided is a preform solder (1) having a metal structure including a first phase (10) that is a continuous phase and a second phase (20) dispersed in the first phase (10), the first phase (10) contains Sn, the second phase (20) is formed of an alloy containing Ni and Fe, and a grain boundary (15) of a metal is present in the first phase (10).

3 Claims, 1 Drawing Sheet

(56) References Cited

U.S. PATENT DOCUMENTS

| | | | |
|---|---|---|---|
| 2016/0128196 | A1 | 5/2016 | Yasui et al. |
| 2019/0001444 | A1 | 1/2019 | Kawaguchi |
| 2019/0084093 | A1 | 3/2019 | Sakata et al. |
| 2019/0118309 | A1 | 4/2019 | Hirota et al. |

FOREIGN PATENT DOCUMENTS

| | | |
|---|---|---|
| JP | 2002-305213 | 10/2002 |
| JP | 2004-247742 | 9/2004 |
| JP | 2009-039769 | 2/2009 |
| JP | 2016-083695 | 5/2016 |
| JP | 2018-174163 | 11/2018 |
| JP | 2020-055032 | 4/2020 |
| JP | 2020-142300 | 9/2020 |
| WO | WO-2003/021664 | 3/2003 |
| WO | WO-2007/032429 | 3/2007 |
| WO | WO-2007/125991 | 11/2007 |
| WO | WO-2012/024795 | 3/2012 |
| WO | WO-2017/047293 | 3/2017 |

OTHER PUBLICATIONS

European Search Report (Application No. 22165032.8) dated Aug. 1, 2022 (4pages).
Korean Office Action (App. No. 10-2022-0037301) dated Aug. 16, 2022 (8pages).
Chinese Office Action for Chinese App No. 202210317808.7, dated Dec. 27, 2022, (8pgs).

\* cited by examiner

PREFORM SOLDER AND METHOD OF MANUFACTURING THE SAME, AND METHOD OF MANUFACTURING SOLDER JOINT

CROSS-REFERENCE TO RELATED APPLICATION

Priority is claimed on Japanese Patent Application No. 2021-059319, filed Mar. 31, 2021, the content of which is incorporated herein by reference.

BACKGROUND OF THE INVENTION

Field of the Invention

The present invention relates to a preform solder and a method of manufacturing the same, and a method of manufacturing a solder joint.

Description of Related Art

In recent years, as an operation environment of a power semiconductor element using silicon carbide (SiC) or the like has become higher in temperature, a solder joint may reach about 250 to 280° C. For this reason, upon an operation under such high temperature conditions, a high temperature solder that does not melt is required.

In fabrication of a solder joint, various types of solder pastes are used as soldering materials. For example, as solder pastes, Ag paste that can be sintered at a low temperature and a transient liquid phase (TLP) paste corresponding to the RoHS Directive of the European Union may be exemplified.

A TLP paste is a paste containing two types of solder powders. In the TLP paste, since the solder powders form a high melting point compound upon heating, it is possible to suppress remelting even when a solder joint is reheated. As such a TLP paste, for example, a paste in which Cu balls and Sn solder balls are dispersed via a flux is proposed (see Patent Document 1).

Alternatively, in fabrication of a solder joint, a bonding method using a preform solder as a soldering material may be utilized.

A preform solder is a solder processed into various shapes such as a square shape, a ribbon shape, a disk shape, and the like.

As such a preform solder, for example, a molding solder made by pressure-molding a mixture of metal powders formed of a solder alloy and metal powder formed of Cu has been proposed (see Patent Documents 2 and 3).

PATENT DOCUMENTS

[Patent Document 1]
 Japanese Unexamined Patent Application, First Publication No. 2002-254194
[Patent Document 2]
 Japanese Unexamined Patent Application, First Publication No. 2020-55032
[Patent Document 3]
 Japanese Unexamined Patent Application, First Publication No. 2020-142300

SUMMARY OF THE INVENTION

However, the solder paste containing the flux as described in Patent Document 1 has a problem that the flux volatilizes during melting of the solder powder, cavities remain in the melting solder, and a large amount of voids are likely to occur during solidification. In particular, during solidification, in the TLP paste in which a high melting point compound is formed, fluidity decreases and it becomes difficult for the cavities to be released to the outside.

As the method of suppressing occurrence of such voids, it is conceivable to adjust the heating conditions, and for example, a heating temperature may be increased to increase fluidity, but there is concern of thermal damage to the semiconductor element. Meanwhile, even when the heating temperature is lowered and a heating time is lengthened, it is difficult to release the cavities because the fluidity is not improved, and occurrence of voids is inevitable.

In a TLP paste, during heating, a strong oxide film is formed on a surface of the solder powder, and an oxide film may remain without being reduced by the flux. For this reason, it becomes difficult for the solder powders to fuse with each other, and cavities may be incorporated into the melting solder, resulting in voids.

On the other hand, in order to reduce the oxide film, although it is conceivable to add a highly active reducing agent to the flux, the reducing gas becomes incorporated during solder melting even when a highly active reducing agent is added, a porous solder joint containing reducing gas results, and as a result, bonding strength is lowered. For this reason, cracks are likely to occur in the solder joint, and reliability is inferior.

In addition, in a solder paste, the particle size of the solder powder may be reduced so that the solder powder is uniformly dispersed in the flux. However, the smaller the particle size of the solder powder, the larger the specific surface area of the powder, which makes it easier for the solder powder to oxidize and occurrence of the voids to be more significant.

When the preform solder disclosed in Patent Documents 2 and 3 is used, an effect of suppressing occurrence of the voids during solder bonding under a high temperature condition (250° C. or more) of the power semiconductor element is weak, and bonding strength of the solder bonding portion is insufficient.

In consideration of the above-mentioned circumstances, the present invention is directed to providing a preform solder and a method of manufacturing the same that are capable of further suppressing occurrence of voids during solder bonding, and a method of manufacturing a solder joint using the preform solder.

The present invention employs the following means in order to solve the above-mentioned problems.

(1) A preform solder including a first metal containing Sn, and a second metal formed of an alloy containing Ni and Fe.

(2) In the preform solder according to (1), a content of the second metal may be 5 to 70 mass % with respect to a total content of the first metal and the second metal.

(3) In the preform solder according to (1) or (2), a particle size of the second metal may be 0.1 to 1000 μm.

(4) A preform solder having a metal structure including a first phase that is a continuous phase, and a second phase dispersed in the first phase, the first phase containing Sn, the second phase being formed of an alloy containing Ni and Fe, and a grain boundary of a metal being present in the first phase.

(5) In the preform solder according to (4), a content of intermetallic compound of Sn and Ni in the metal structure is 0 mass % or more and 70 mass % or less with respect to a total mass of the metal structure.

(6) A method of manufacturing a preform solder including a mixing process of mixing a first metal powder containing Sn and a second metal powder formed of an alloy containing Ni and Fe and preparing a metal powder mixture; and a rolling process of rolling the metal powder mixture and fabricating a preform solder.

(7) In the method of manufacturing a preform solder according to (6), in the mixing process, the first metal powder and the second metal powder may be mixed at a ratio of 30 to 95 parts of the first metal powder to 5 to 70 parts of the second metal powder.

(8) In the method of manufacturing a preform solder according to (6) or (7), a particle size of the second metal powder is 0.1 to 1000 μm.

(9) In the method of manufacturing a preform solder according to any one of (6) to (8), a particle size of the first metal powder is 0.1 to 1000 μm.

(10) In the method of manufacturing a preform solder according to any one of (6) to (9), a content of Ni in the second metal powder is 80 mass % or more and 99 mass % or less with respect to a total mass of the second metal powder.

(11) In the method of manufacturing a preform solder according to (10), a content of Fe in the second metal powder is 1 mass % or more and 20 mass % or less with respect to the total mass of the second metal powder.

(12) In the method of manufacturing a preform solder according to any one of (6) to (11), a melting point of the first metal powder is 250° C. or less.

(13) A method of manufacturing a solder joint formed in a bonding area between objects using the preform solder manufactured by the method of manufacturing a preform solder according to any one of (6) to (12).

(14) A preform solder including a first metal containing Sn and a second metal formed of an alloy containing Ni and Fe, wherein a melting point of the first metal is 250° C. or less, a melting point of the alloy in the second metal exceeds 250° C., a content of Sn in the first metal is 20 mass % or more and 100 mass % or less with respect to a total mass of the first metal, a content of Ni in the second metal is 80 mass % or more and 99 mass % or less with respect to a total mass of the second metal, a content of Fe in the second metal is 1 mass % or more and 20 mass % or less with respect to the total mass of the second metal, a particle size of the second metal is 0.1 to 1000 μm, and a content of the second metal is 5 to 70 mass % with respect to a total content of the first metal and the second metal.

(15) A preform solder having a metal structure including a first phase that is a continuous phase and a second phase dispersed in the first phase, wherein the first phase is formed of a metal containing Sn, the second phase is composed of an alloy containing Ni and Fe, a melting point of the metal that composes the first phase is 250° C. or less, a melting point of the alloy that composes the second phase exceeds 250° C., a content of Sn in the metal that composes the first phase is 20 mass % or more and 100 mass % or less with respect to a total mass of the metal, a content of Ni in the alloy that composes the second phase is 80 mass % or more and 99 mass % or less with respect to a total mass of the alloy, a content of Fe in the alloy that composes the second phase is 1 mass % or more and 20 mass % or less with respect to the total mass of the alloy, a particle size of the alloy is 0.1 to 1000 μm, the content of the alloy that composes the second phase is 5 to 70 mass % with respect to a total content of the metal that composes the first phase and the alloy that composes the second phase, and a grain boundary of the metal is present in the first phase.

(16) The preform solder according to (15), a content of intermetallic compound of Sn and Ni in the metal structure being 0 mass % or more and 70 mass % or less with respect to a total mass of the metal structure.

(17) A method of manufacturing a preform solder including: a mixing process of mixing a first metal powder containing Sn and a second metal powder formed of an alloy containing Ni and Fe and preparing a metal powder mixture; and a rolling process of rolling the metal powder mixture and fabricating a preform solder, wherein a melting point of the first metal powder is 250° C. or less, a melting point of the alloy in the second metal powder exceeds 250° C., a content of Sn in the first metal powder is 20 mass % or more and 100 mass % or less with respect to a total mass of the first metal powder, a content of Ni in the second metal powder is 80 mass % or more and 99 mass % or less with respect to a total mass of the second metal powder, a content of Fe in the second metal powder is 1 mass % or more and 20 mass % or less with respect to the total mass of the second metal powder, a particle size of the first metal powder is 0.1 to 1000 μm, a particle size of the second metal powder is 0.1 to 1000 μm, and in the mixing process, the first metal powder and the second metal powder are mixed at a ratio of 30 to 95 parts of the first metal powder and 5 to 70 parts of the second metal powder.

(18) A method of manufacturing a solder joint formed in a bonding area between objects using the preform solder manufactured by the method of manufacturing a preform solder according to claim 17).

According to the present invention, it is possible to provide a preform solder and method of manufacturing the same that are capable of further suppressing occurrence of voids during solder bonding.

In addition, according to the present invention, it is possible to provide a method of manufacturing a solder joint capable of increasing shear strength.

DETAILED DESCRIPTION OF THE INVENTION (Preform Solder: First Embodiment)

Figure 1:
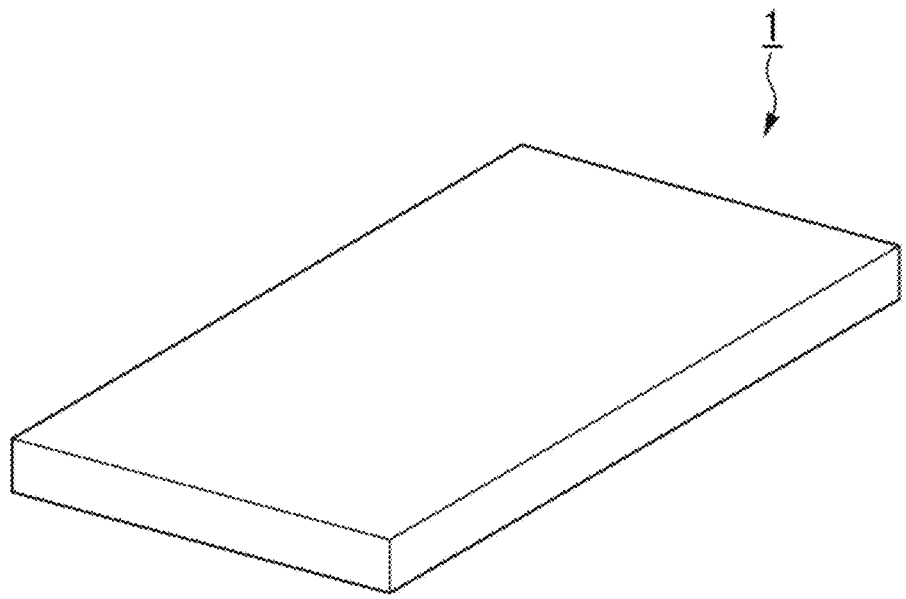
FIG. 1 is a perspective view of an embodiment of a preform solder.

FIG. 1 is an embodiment of a preform solder according to the present invention. A preform solder 1 has a square form and includes a first metal containing Sn, and a second metal formed of an alloy containing Ni and Fe.

<First Metal>

The first metal contains Sn.

Since Sn has excellent spreadability, the first metal containing Sn can eliminate the cavities between the first metals by plastic deformation. In addition, the first metal containing Sn can guarantee general performance with regard to such as wettability or the like for the soldering material.

The first metal may contain a metal other than Sn. That is, the first metal may be Sn alone, a mixture of Sn and a metal other than Sn, an alloy of Sn and a metal other than Sn, or may be a mixture in which the alloy containing Sn and other metals are mixed.

As the metal other than Sn, which may be contained in the first metal, for example, Ag, Cu, In, Bi, Ni, Ge, P, Co, Ga, Zn, Sb, Pb, Au, Al, Pt, Pd, Fe, Mn, and Zr may be exemplified. Regarding these metals other than Sn, one metal may be contained, or may two or more metals may be contained.

The first metal may contain inevitable impurities other than the above-mentioned metals. Despite these inevitable impurities being contained, no influence in exerted on the effects of the present invention thereby.

A melting point of the first metal is preferably 250° C. or lower, more preferably 232° C. or lower, and further preferably 116 to 200° C.

When the melting point of the first metal is less than or equal to the upper limit of the preferable range, it is easy to secure wettability of the solder.

"The melting point of the metal or the melting point of the metal powder" disclosed herein refers a melting point measured by differential scanning calorimetry (DSC). The melting point of the first metal can be measured using, for example, a DSC7020 manufactured by Hitachi High-Tech Science Company. The melting point of the second metal can be measured using, for example, a DSC404-F3 Pegasus manufactured by NETZSCH company.

A content of Sn in the first metal is preferably 20 mass % or more and 100 mass % or less with respect to a total mass of the first metal. In order for properties of Sn to be sufficiently exhibited, the content of Sn in the first metal is preferably 90 mass % or more, more preferably 95 mass % or more, and further preferably 100 mass % with respect to the total mass of the first metal.

<Second Metal>

The second metal is formed of an alloy containing Ni and Fe.

The alloy in the second metal contains Ni and Fe, a melting point of the second metal is higher than that of the first metal, and the second metal is preferably dispersed in the preform solder.

The melting point of the alloy in the second metal preferably exceeds 250° C., more preferably 300° C. or more, and further preferably 500 to 1500° C.

When the melting point of the alloy in the second metal exceeds the lower limit of the preferable range, it becomes easier to achieve the high temperature of the solder joint.

The alloy in the second metal may contain a metal other than Ni and Fe. That is, the second metal may be an alloy of Ni and Fe, may be an alloy of Ni, Fe and a metal other than them, and among these, may be an alloy of Ni and Fe.

As the metal other than Ni and Fe, which may be contained in the second metal, for example, Ag, Cu, In, Bi, Ge, P, Co, Ga, Zn, Sb, Pb, Au, Al, Pt, Pd, Mn, and Zr are exemplified. These metals other than Ni and Fe may contain one metal, or two or more metals.

The second metal may contain inevitable impurities other than the above-mentioned metal. Even when the inevitable impurities are contained, it does not exert an influence on the effect of the present invention.

Contents of Ni in the second metal is preferably 80 mass % or more and 99 mass % or less, and more preferably 85 mass % or more and 95 mass % or less with respect to the total mass of the second metal.

Contents of Fe in the second metal is preferably 1 mass % or more and 20 mass % or less, and more preferably 5 mass % or more and 15 mass % or less with respect to the total mass of the second metal.

When the contents of Ni and Fe in the second metal are within the preferable range, an intermetallic compound is formed at an earlier stage, and occurrence of the voids can be minimized.

In the preform solder according to the first embodiment, the second metal has a particle size that is preferably 0.1 to 1000 μm, more preferably 1 to 100 μm, and further preferably 5 to 50 μm.

When the particle size of the second metal is equal to or greater than the lower limit of the preferable range, wettability is easily secured, and when equal to or less than the upper limit of the preferable range, the intermetallic compound is more easily formed.

"The particle size of the metal or the particle size of the metal powder" disclosed herein refers an average particle size when measured with reference to a volume using a laser diffraction/scattering-type particle size distribution measuring device.

In the preform solder according to the first embodiment, from the viewpoint of compatibility between bondability and shear strength, a mixing ratio of the first metal and the second metal is represented as the content of the second metal with respect to the total contents of the first metal and the second metal, which is preferably 5 to 70 mass %, more preferably 10 to 50 mass %, and further preferably 20 to 30 mass %.

When the content of the second metal is equal to or greater than the lower limit of the preferable range, occurrence of the voids during Sn melting is easily minimized. In addition, heat resistance of the solder bonding portion is further improved. When equal to or less than the upper limit of the preferable range, occurrence of the voids is minimized by suppressing generation of a porous structure due to formation of the intermetallic compound, and shear strength is easily secured. In particular, occurrence of micro voids in the solder bonding portion is easily minimized.

In the preform solder according to the first embodiment, it is preferable that the intermetallic compound of the first metal and the second metal is not contained, or a very small content is contained. With such a preform solder, occurrence of the voids is more likely to be minimized during solder bonding.

(Preform Solder: Second Embodiment)

Figure 2:
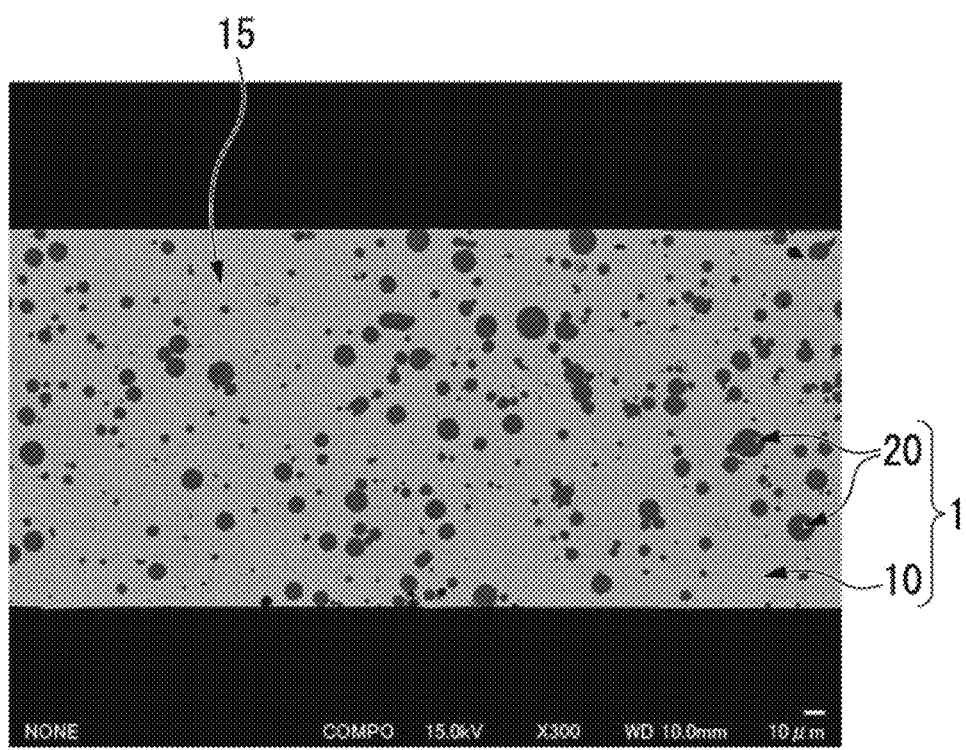
FIG. 2 is an SEM image (magnification 300 times) showing a cross section in a thickness direction of the embodiment of the preform solder.

FIG. 2 is a SEM image (magnification 300 times) showing a cross section in a thickness direction in the embodiment of the preform solder according to the present invention. Further, the SEM image of FIG. 2 is an observation image of a cross section parallel to a rolling direction in the preform solder manufactured by a rolling method.

The preform solder 1 shown in FIG. 2 has a metal structure including a first phase 10 that is a continuous phase, and a second phase 20 dispersed in the first phase 10.

The first phase 10 contains Sn. A grain boundary 15 of the metal is present in the first phase 10. The second phase 20 is formed of an alloy containing Ni and Fe.

In the preform solder 1, the first phase 10 is a continuous phase, and composed by a metal containing Sn. Description of the metal containing Sn and content thereof is the same as the above-mentioned <first metal>.

In addition, the grain boundary 15 is present between metal crystals containing Sn in the first phase 10.

In the preform solder 1, the second phase 20 is dispersed in the first phase 10.

The second phase 20 is formed of an alloy containing Ni and Fe. Description of the alloy containing Ni and Fe, the particle sizes thereof, the contents thereof, and the like, are the same as the above-mentioned <second metal>.

In the preform solder 1, from the viewpoint of the bondability and the shear strength, a mixing ratio of the metal containing Sn that composes the first phase 10 and an alloy containing Ni and Fe that compose the second phase 20 is represented as the content of the alloy that composes the second phase 20 with respect to the total content of the metal that composes the first phase 10 and the alloy that composes the second phase 20, which is preferably 5 to 70 mass %, more preferably 10 to 50 mass %, and further preferably 20 to 30 mass %.

When the content of the alloy that composes the second phase 20 is equal to or greater than the lower limit of the preferable range, occurrence of the voids during Sn melting is easily minimized. In addition, heat resistance of the solder bonding portion is further improved. When equal to or less than the upper limit of the preferable range, occurrence of the voids is minimizing by suppressing generation of the porous structure due to formation of the intermetallic compound, and shear strength is easily secured.

While the metal structure that composes the preform solder 1 includes the first phase 10 and the second phase 20, a third phase containing an intermetallic compound is present between the first phase 10 and the second phase 20 or its abundance is low.

In the preform solder 1, the content of the intermetallic compound of Sn and Ni in the metal structure is small, preferably 0 mass % or more and 70 mass % or less, more preferably 0 mass % or more and 30 mass % or less, and most preferably 0 mass % with respect to the total mass of the metal structure.

In the preform solder 1, when the content of the intermetallic compound of Sn and Ni in the metal structure is equal to or less than the upper limit of the preferable range, occurrence of the voids is more likely to be minimized during solder bonding.

As the shape of the preform solder according to the above-mentioned first embodiment or second embodiment, a square shape, a ribbon shape, a disk shape, a washer shape, a chip shape, a wire shape, and the like, are exemplified.

In manufacturing of the preform solder according to the above-mentioned first embodiment or second embodiment, a known manufacturing method can be used, and for example, a melting method and a rolling method can be applied thereto. Among these, in manufacturing of the preform solder according to the embodiment, in particular, generation of the intermetallic compound of Sn and Ni is easily suppressed, occurrence of a large diameter of voids can be minimized, the amount of the voids occurred is small and difficult to occur, and thus, it is preferable to apply the rolling method.

As described above, the preform solder according to the embodiment is composed of the first metal containing Sn, and the second metal formed of an alloy containing Ni and Fe.

In the preform solder according to the embodiment, since it is different from the TLP paste or the like used in the related art and the flux is not used, voids are unlikely to occur under the high temperature conditions.

In addition, in the preform solder according to the embodiment, since the alloy containing Ni and Fe is used as the second metal, occurrence of the voids is further minimized, and in particular, occurrence of the voids can be further minimized during solder bonding under the high temperature condition (250° C. or more). The reason which such an effect is obtained is not clear, but it is presumed as follows.

During reflow, the alloy containing Ni and Fe reacts with the first metal containing Sn to generate an intermetallic compound $Ni_3Sn_4$.

Meanwhile, when Cu is used instead of the alloy containing Ni and Fe, during reflow, Cu reacts with the first metal containing Sn to generate an intermetallic compound $Cu_6Sn_5(Cu_3Sn)$.

Comparing the case in which the alloy containing Ni and Fe is used with the case in which Cu is used, the amount of Sn consumed differs. In addition, generation of the intermetallic compound may be faster in this embodiment. That is, in the embodiment, during reflow, since a large amount of Sn is used and Sn is consumed quickly, the melting behavior of Sn is suppressed.

In addition, when the content of the second metal formed of the alloy containing Ni and Fe increases, the content (area %) of the intermetallic compound $Ni_3Sn_4$ in the bonding area tends to increase. Fe contributes to this, and the action of Fe causes more intermetallic compounds to be generated. When the alloy containing Ni and Fe is used, a compound containing Fe is formed in the intermetallic compound $Ni_3Sn_4$. The presence or absence of Fe in the intermetallic compound varies depending on an analysis site, and it does not necessarily result in the compound containing Fe, but it is considered that Fe along does not exist in the preform solder.

As described above, by suppressing the melting behavior of Sn and generating the intermetallic compound, occurrence of the voids is minimized in the preform solder according to the embodiment, and in particular, occurrence of the voids can be minimized during solder bonding under the high temperature condition (250° C. or more).

(Method of Manufacturing Preform Solder)

An embodiment of a method of manufacturing a preform solder according to the present invention is a manufacturing method including a mixing process of mixing first metal powder containing Sn and second metal powder formed on an alloy containing Ni and Fe and preparing a metal powder mixture, and a rolling process of rolling the metal powder mixture and fabricating a preform solder.

First Metal Powder:

The metal that composes the first metal powder used in the embodiment is a metal containing Sn. Description of the metal containing Sn is the same as the above-mentioned <first metal>.

The melting point of the first metal powder is preferably 250° C. or less, more preferably 232° C. or less, and further preferably 116 to 200° C.

When the melting point of the first metal powder is equal to or less than the upper limit of the preferable range, wettability of the solder is easily secured.

The content of Sn in the first metal powder is preferably 20 mass % or more and 100 mass % or less with respect to the total mass of the first metal powder. In order to sufficiently exhibit properties of Sn, the content of Sn in the first metal powder is preferably 90 mass % or more, more preferably 95 mass % or more, and further preferably 100 mass % with respect to the total mass of the first metal powder.

The first metal powder has a particle size that is preferably 0.1 to 1000 μm, more preferably 1 to 100 μm, and further preferably 5 to 50 μm.

When the particle size of the first metal powder is equal to or greater than the lower limit of the preferable range, wettability is easily secured, and when equal to less than the upper limit of the preferable range, the intermetallic compound is more easily formed.

Second Metal Powder:

The metal that composes the second metal powder used in the embodiment is the alloy containing Ni and Fe, and the melting point thereof is higher than that of the first metal powder. Description of the alloy containing Ni and Fe is the same as the above-mentioned <second metal>.

The melting point of the alloy in the second metal powder preferably exceeds 250° C., is more preferably 300° C. or more, and further preferably 500 to 1500° C.

When the melting point of the second metal powder exceeds the lower limit of the preferable range, it is easy to achieve the high temperature of the solder joint.

The content of Ni in the second metal powder is preferably 80 mass % or more and 99 mass % or less, and more preferably 85 mass % or more and 95 mass % or less with respect to the total mass of the second metal powder.

The content of Fe in the second metal powder is preferably 1 mass % or more and 20 mass % or less, and more preferably 5 mass % or more and 15 mass % or less with respect to the total mass of the second metal powder.

When the contents of Ni and Fe in the second metal powder is within the preferable range, the intermetallic compound is formed in an earlier stage, and occurrence of the voids can be minimized.

The second metal powder has a particle size that is preferably 0.1 to 1000 μm, more preferably 1 to 100 μm, and further preferably 5 to 20 μm.

When the particle size of the second metal powder is equal to or greater than the lower limit of the preferable range, wettability is easily secured, and when equal to or less than the upper limit of the preferable range, the intermetallic compound is more easily formed.

[Mixing Process]

In the mixing process, the first metal powder and the second metal powder are mixed to prepare a metal powder mixture.

A compounding ratio when both are mixed is preferably a ratio in which the first metal powder 30 to 95 parts and the second metal powder 5 to 70 parts are mixed, more preferably a ration in which the first metal powder 50 to 90 parts and the second metal powder 10 to 50 parts are mixed, further preferably a ratio in which the first metal powder 70 to 80 parts and the second metal powder 20 to 30 parts are mixed.

Since the compounding ratio when both are mixed is within the preferable range, occurrence of the voids is minimized, shear strength is easily secured, and heat resistance of the solder bonding portion is further improved.

[Rolling Process]

In the rolling process, the metal powder mixture fabricated through the mixing process is rolled, and the preform solder formed in a desired shape is fabricated.

In the method of rolling the metal powder mixture, a known rolling method may be used, and for example, it may be processed using a double roll type roller or the like. The number of rolling times, and a rolling load applied to the metal powder mixture may be appropriately set according to a desired shape and thickness of the target preform solder.

As described above, the method of manufacturing a preform solder according to the embodiment includes the mixing process of mixing the first metal powder and the second metal powder and preparing the metal powder mixture, and the rolling process. In the mixing process, since the alloy containing Ni and Fe is employed as the second metal powder and the metal powder mixture is processed through rolling, the preform solder in which generation of the intermetallic compound of Sn and Ni in the metal structure is suppressed and occurrence of the voids during solder bonding is further minimized can be easily manufactured.

The method of manufacturing a preform solder according to the embodiment is useful as the method of manufacturing the preform solder according to the first embodiment or the second embodiment.

The method of manufacturing a preform solder according to the present invention is not limited to the above-mentioned embodiment, and for example, may be an embodiment further including another process in addition to the above-mentioned mixing process and rolling process.

In addition, the method of manufacturing a preform solder according to the present invention is not limited to the embodiment, and may use metal powder (hereinafter, also referred to as "third metal powder") other than the first metal powder and the second metal powder.

The third metal powder is not particularly limited to the composition as long as the composition of the first metal powder and the second metal powder differs, and preferably powder formed of a single metal such as Cu, Ag, Al or Ni, or an alloy formed of two or more elements of these single metals.

The third metal powder has a particle size that is preferably 0.1 to 1000 μm, more preferably 1 to 100 μm, and further preferably 5 to 50 μm.

The metal that composes the third metal powder may contain one kind or two or more kinds.

(Method of Manufacturing Solder Joint)

An embodiment of the method of manufacturing a solder joint according to the present invention is a manufacturing method of forming a bonding area between objects using the preform solder manufactured by the above-mentioned (method of manufacturing a preform solder).

The objects to be bonded by applying such a manufacturing method are not particularly limited. For example, the semiconductor element and the board can be bonded by applying such a manufacturing method.

As the semiconductor element, a silicon carbide (SiC) chip, a Si chip, or the like, is exemplified.

As the board, a circuit board, a ceramic board, a metal board, a direct copper bonding (DCB) board, or the like, is exemplified. An electrode on the board may be, for example, a Cu electrode, or a Cu electrode processed with any one of Sn plating, Ni plating, Ni—Au plating, Ni—Pd plating and Ni—Pd—Au plating.

Further, during bonding, the flux may be applied in advance to one or both surfaces of the preform solder, which become bonding surfaces, a bonding surface of the semiconductor element, or a bonding surface of the board.

A temperature when the semiconductor element and the board are bonded is, for example, preferably 120° C. or more and 400° C. or less, may be 200° C. or more and 400° C. or less, or may be 250° C. or more and 400° C. or less, and the method of manufacturing a solder joint of the embodiment is useful in bonding under the high temperature condition (250° C. or more).

The atmosphere when the objects are bonded may be nitrogen atmosphere or may be reducing atmosphere.

In the case of the nitrogen atmosphere, the pressure applied during bonding is adjusted to preferably 0.1 MPa or more and 10 MPa or less. Under such a nitrogen atmosphere, the effect of minimizing occurrence of the voids is enhanced by bonding the objects.

In the case of the reducing atmosphere, the objects can be bonded without pressurization.

As described above, in the method of manufacturing a solder joint according to the embodiment, during reflow, since the alloy containing Ni and Fe reacts with the first metal containing Sn to generate the intermetallic compound, heat resistance of the solder bonding portion is further improved. In addition, since occurrence of the voids in the solder bonding portion is further minimized, it is possible to manufacture the solder joint with the increased shear strength.

The method of manufacturing a solder joint according to the embodiment is particularly useful in applications where the high temperature solder that is not melted is required, during operation under the high temperature condition like the power semiconductor element.

Hereinabove, while the embodiment of the disclosure has been described in detail with reference to the accompanying drawings, characteristic parts may be enlarged for convenience in these drawings, and dimensional ratios or the like of the components are not limited to those shown in the drawings.

A specific configuration of the embodiment according to the present invention is not limited to the embodiment of the disclosure, and may be changed or substituted without departing from the spirit of the disclosure.

EXAMPLE

Hereinafter, while the present invention has been described according to the example, the present invention is not limited to the following example. In the example, metal powder as described below is used.

In the particle size of the metal powder, an average particle size was measured with reference to a volume using a laser diffraction/scattering-type particle size distribution measuring device.

The melting point of the metal powder was measured by differential scanning calorimetry (DSC) using DSC7020 manufactured by Hitachi High-Tech Science Company in the case of the first metal powder and using DSC404-F3 Pegasus manufactured by NETZSCH Company in the case of the second metal powder.

First Metal Powder:
Metal powder (Sn 100 mass % powder) particle size 10 μm and melting point 232° C. of Sn 100 mass %
Metal powder (Sn 100 mass % powder) particle size 20 μm and melting point 232° C. of Sn 100 mass %
Metal powder (Sn 100 mass % powder) particle size 30 μm and melting point 232° C. of Sn 100 mass %
Metal powder (Sn 100 mass % powder) particle size 35 μm and melting point 232° C. of Sn 100 mass %
Metal powder (Sn42Bi58 mass % powder), particle size 10 μm, and melting point 139° C., formed of alloy of Sn 42 mass % and Bi 58 mass %
Metal powder (Sn48In52 mass % powder), particle size 10 μm, and melting point 116° C., formed of alloy of Sn 48 mass % and In 52 mass %

Second Metal Powder:
Metal powder (Ni-10 mass % Fe powder), and particle size 10 μm, formed of alloy of Ni 90 mass % and Fe 10 mass %
Metal powder (Ni-1 mass % Fe powder), and particle size 10 μm, formed of alloy of Ni 99 mass % and Fe 1 mass %
Metal powder (Ni-20 mass % Fe powder), and particle size 10 μm, formed of alloy of Ni 80 mass % and Fe 20 mass %

Third Metal Powder:
Metal powder (Cu 100 mass % powder) particle size 10 μm of Cu 100 mass %
Metal powder (Ni 100 mass % powder) particle size 10 μm of Ni 100 mass %
Metal powder (Fe 100 mass % powder) particle size 10 μm of Fe 100 mass %

<Manufacturing of Soldering Material>

Each of the above-mentioned first metal powder, second metal powder and third metal powder was fabricated. A soldering material of each example was measured using metal powder thereof.

Example 1

Mixing Process:
88 parts of Sn 100 mass % powder with a particle size 10 μm as the first metal powder and 12 parts of Ni-10 mass % Fe powder with a particle size 10 μm as the second metal powder were agitated to manufacture the metal powder mixture.

Rolling Process:
Next, the prepared metal powder mixture was introduced into a hopper of the double roll type roller, the number of rolling was set to one, the rolling load was about 20 kN, and thus, a strip-shaped rolling material was obtained. The rolling material obtained in this way was punched by a press machine to fabricate a preform solder having a thickness of 0.15 mm and a square shape of 5 mm×5 mm.

In the fabricated preform solder of Example 1, cross section observation in a thickness direction (magnification 300 times) was performed using an electron microscope (manufactured by JEOL Corp., JSM-7000F) under a condition of an applied voltage 15 kV.

As a result, it has been confirmed that the preform solder of Example 1 has the metal structure including the same shape as the SEM image shown in FIG. 2, i.e., the first phase that is a continuous phase and the second phase dispersed in the first phase, and a grain boundary of the metal is present in the first phase.

Examples 2 to 17

As shown in Tables 1 and 2, like Example 1 except that the first metal powder and the second metal powder are used at a predetermined mixing ratio, the mixing process and the rolling process were performed in sequence, and the preform solder having a thickness of 0.15 mm and a square shape of 5 mm×5 mm was fabricated.

Comparative Example 1

88 parts of Sn 100 mass % powder with a particle size 10 μm as the first metal powder and 12 parts of Ni-10 mass % Fe powder with a particle size 10 μm as the second metal powder were agitated to prepare the metal powder mixture.

Next, 88.5 parts of the metal powder mixture and 11.5 parts of the flux shown in the following were mixed to prepare the solder paste.

Flux (composition): rosin 46 mass %, solvent 32 mass %, thixo agent 8 mass %, activator 14 mass %

Comparative Examples 2 to 4

As shown in Table 2, like Example 1 except that the first metal powder and the third metal powder are used at a predetermined mixing ratio, the mixing process and the rolling process were performed in sequence to fabricate the preform solder having a thickness of 0.15 mm and a square shape of 5 mm×5 mm.

<Manufacturing of Solder Joint>

The fabricated preform solder of each example was mounted on a Cu board having a thickness of 0.5 mm and a size of 50 mm×50 mm, an Si board having a thickness of 0.4 mm and a size of 5 mm×5 mm was mounted on the preform solder, and soldering was performed.

After that, in a profile in which a peak temperature is 250° C. and a cooling speed is 2° C./sec, the soldering was performed in a reflow furnace with no pressurization or with pressurization under the formic acid atmosphere, and the solder joint was fabricated.

When each of preform solders of Examples 1, 4, 5, 11 to 13, 16 and 17 and Comparative examples 1 to 4 was used, the soldering was performed with no pressurization, and the solder joint was fabricated.

When the preform solder of each of Examples 2, 3, 6 to 10, 14 and 15 was used, the soldering was performed with pressurization, and the solder joint was fabricated.

<Estimation>

In the fabricated solder joint, content, a void fraction and shear strength of each of the intermetallic compound and the first metal in the bonding area were measured as described below. Results of measurement and estimation thereof are shown in Tables 1 and 2.

[Measurement of Content of Each of Intermetallic Compound and First Metal in Bonding Area, and Void Fraction]

In the fabricated solder joint, a cross section SEM photograph was imaged by an electron microscope (manufactured by JEOL Corp., JSM-7000F). In the cross section SEM photograph, the void fraction (area %) was calculated for the places bonded by the preform solder as a whole except upper and lower members.

In addition, a content of the intermetallic compound, a content of Sn, a content of Bi, and a content of In (each area %) in the bonding area were calculated from contrast using image analysis software "Scandium" of West Bloom Digital Image Corp.

Further, a sum of area % of the content of the intermetallic compound, the content of Sn, the content of Bi, the content of In, and the void fraction was 100 area %.

[Measurement of Shear Strength]

In the fabricated solder joint, shear strength (N) in the bonding area was measured under a condition of 6.0 mm/min and 250° C. by a shearing strength measuring device (manufactured by Rhesca Company, STR-1000).

It was measured as "A" when the measured shear strength is 1.0 N or more and it was measured as "B" when less than 1.0 N.

TABLE 1

| | | | | Ex) 1 | Ex) 2 | Ex) 3 | Ex) 4 | Ex) 5 | Ex) 6 | Ex) 7 | Ex) 8 | Ex) 9 | Ex) 10 |
|---|---|---|---|---|---|---|---|---|---|---|---|---|---|
| Metal powder | First metal powder | Sn 100 mass % powder | Powder diameter 10 μm | 88 | 92 | 90 | 85 | 80 | 70 | 60 | 50 | 40 | 30 |
| | | Sn 100 mass % powder | Powder diameter 20 μm | | | | | | | | | | |
| | | Sn 100 mass % powder | Powder diameter 30 μm | | | | | | | | | | |
| | | Sn 100 mass % powder | Powder diameter 35 μm | | | | | | | | | | |
| | | Sn42Bi58 mass % powder | Powder diameter 10 μm | | | | | | | | | | |
| | | Sn48In52 mass % powder | Powder diameter 10 μm | | | | | | | | | | |
| | Second metal powder | Ni-10 mass % Fe powder | Powder diameter 10 μm | 12 | 8 | 10 | 15 | 20 | 30 | 40 | 50 | 60 | 70 |
| | | Ni-1 mass % Fe powder | Powder diameter 10 μm | | | | | | | | | | |
| | | Ni-20 mass % Fe powder | Powder diameter 10 μm | | | | | | | | | | |
| | Third metal powder | Cu 100 mass % powder | Powder diameter 10 μm | | | | | | | | | | |
| | | Ni 100 mass % powder | Powder diameter 10 μm | | | | | | | | | | |
| | | Fe 100 mass % powder | Powder diameter 10 μm | | | | | | | | | | |
| Form of soldering material | | | | Preform | Preform | Preform | Preform | Preform | Preform | Preform | Preform | Preform | Preform |
| Joining area | Content of intermetallic compound | | Area % | 39.50 | 24.12 | 31.85 | 48.31 | 65.16 | 95.43 | 92.45 | 88.75 | 80.32 | 78.32 |
| | Content of Sn | | Area % | 56.49 | 66.34 | 61.11 | 48.56 | 32.11 | 0 | 0 | 0 | 0 | 0 |
| | Content of Bi | | Area % | — | — | — | — | — | — | — | — | — | — |
| | Content of In | | Area % | — | — | — | — | — | — | — | — | — | — |

TABLE 1-continued

|  |  |  | Ex) 1 | Ex) 2 | Ex) 3 | Ex) 4 | Ex) 5 | Ex) 6 | Ex) 7 | Ex) 8 | Ex) 9 | Ex) 10 |
|---|---|---|---|---|---|---|---|---|---|---|---|---|
| Estimation | Void fraction | Area % | 4.01 | 9.54 | 7.04 | 3.14 | 2.73 | 4.57 | 7.55 | 11.25 | 19.68 | 21.68 |
|  | Shear strength | N | 3.4 | 1.1 | 1.5 | 9.1 | 20.8 | 28.7 | 24.3 | 17.7 | 3.8 | 2.6 |
|  | at 250° C. | A or B | A | A | A | A | A | A | A | A | A | A |

TABLE 2

|  |  |  |  | Ex) 11 | Ex) 12 | Ex) 13 | Ex) 14 | Ex) 15 | Ex) 16 | Ex) 17 | Comp Ex) 1 | Comp Ex) 2 | Comp Ex) 3 | Comp Ex) 4 |
|---|---|---|---|---|---|---|---|---|---|---|---|---|---|---|
| Metal powder | First metal powder | Sn 100 mass % powder | Powder diameter 10 μm |  |  |  |  |  | 88 | 88 | 88 | 88 | 88 | 88 |
|  |  | Sn 100 mass % powder | Powder diameter 20 μm | 88 |  |  |  |  |  |  |  |  |  |  |
|  |  | Sn 100 mass % powder | Powder diameter 30 μm |  | 88 |  |  |  |  |  |  |  |  |  |
|  |  | Sn 100 mass % powder | Powder diameter 35 μm |  |  | 88 |  |  |  |  |  |  |  |  |
|  |  | Sn42Bi58 mass % powder | Powder diameter 10 μm |  |  |  | 88 |  |  |  |  |  |  |  |
|  |  | Sn48In52 mass % powder | Powder diameter 10 μm |  |  |  |  | 70 |  |  |  |  |  |  |
|  | Second metal powder | Ni-10 mass % Fe powder | Powder diameter 10 μm | 12 | 12 | 12 | 12 | 30 |  | 12 |  |  |  |  |
|  |  | Ni-1 mass % Fe powder | Powder diameter 10 μm |  |  |  |  |  | 12 |  |  |  |  |  |
|  |  | Ni-20 mass % Fe powder | Powder diameter 10 μm |  |  |  |  |  |  | 12 |  |  |  |  |
|  | Third metal powder | Cu 100 mass % powder | Powder diameter 10 μm |  |  |  |  |  |  |  | 12 |  |  |  |
|  |  | Ni 100 mass % powder | Powder diameter 10 μm |  |  |  |  |  |  |  |  |  | 12 | 10.8 |
|  |  | Fe 100 mass % powder | Powder diameter 10 μm |  |  |  |  |  |  |  |  |  |  | 1.2 |
| Form of soldering material |  |  |  | Preform | Preform | Preform | Preform | Preform | Preform | Preform | Paste | Preform | Preform | Preform |
| Joining area | Content of intermetallic compound | Area % |  | 39.99 | 40.08 | 40.13 | 39.95 | 91.83 | 35.16 | 37.85 | 16.64 | 17.34 | 27.32 | 27.21 |
|  | Content of Sn | Area % |  | 56.38 | 56.37 | 56.39 | 9.17 | 0 | 55.33 | 54.72 | 27.32 | 41.97 | 44.44 | 46.84 |
|  | Content of Bi | Area % |  | — | — | — | 44.68 | — | — | — | — | — | — | — |
|  | Content of In | Area % |  | — | — | — | — | 0 | — | — | — | — | — | — |
| Estimation | Void fraction | Area % |  | 3.63 | 3.55 | 3.48 | 6.20 | 8.17 | 9.51 | 7.43 | 56.04 | 40.69 | 28.24 | 25.95 |
|  | Shear strength at 250° C. | N |  | 3.8 | 4.2 | 4.4 | 6.3 | 8.7 | 1.1 | 2.1 | 0 | 0 | 0.6 | 0.5 |
|  |  | A or B |  | A | A | A | A | A | A | A | B | B | B | B |

From the results shown in Tables 1 and 2, it can be confirmed that the preform solders of Examples 1 to 17, to which the present invention is applied, have low void fractions in comparison with the paste of Comparative example 1 and the preform solders of Comparative examples 2 to 4, and occurrence of the voids can be further minimized during solder bonding under a high temperature condition of 250° C.

In addition, it can be confirmed that the solder joints formed using the preform solders of Examples 1 to 17 have increased shear strength.

EXPLANATION OF REFERENCES

1 Preform solder
10 First phase
15 Grain boundary
20 Second phase

What is claimed is:
1. A preform solder comprising a first metal containing Sn, and a second metal formed of an alloy containing Ni and Fe,
wherein a melting point of the first metal is 250° C. or less, a melting point of the alloy in the second metal exceeds 250° C., a content of Sn in the first metal is 100 mass % or less with respect to a total mass of the first metal, a content of Ni in the second metal is 80 mass % or more and 99 mass % or less with respect to a total mass of the second metal, a content of Fe in the second metal is 1 mass % or more and 20 mass % or less with respect to the total mass of the second metal, a particle size of the second metal is 0.1 to 1000 μm, a content of the second metal is 5 to 70 mass % with respect to a total content of the first metal and the second metal, and when the preform solder is mounted on a Cu board having a thickness of 0.5 mm and a size of 50 mm ×50 mm, an Si board having a thickness of 0.4 mm and a size of 5 mm ×5 mm is mounted on the preform solder, soldering is performed, and then, in a profile in which a peak temperature is 250° C. and a cooling speed is 2° C./sec, the soldering is performed in a reflow furnace with no pressurization or with pressurization under formic acid atmosphere to fabricate a solder joint, the solder joint has a shear strength of 1.0 N or more in a bonding area, the shear strength being measured under a condition of 6.0 mm/min and 250° C.

2. A preform solder having a metal structure comprising a first phase that is a continuous phase, and a second phase dispersed in the first phase, wherein the first phase is formed of a metal containing Sn, the second phase is composed of an alloy containing Ni and Fe, a melting point of the metal that composes the first phase is 250° C. or less, a melting point of the alloy that composes the second phase exceeds 250° C., a content of Sn in the metal that composes the first phase is 20 mass % or more and 100 mass % or less with respect to a total mass of the metal, a content of Ni in the alloy that composes the second phase is 80 mass % or more and 99 mass % or less with respect to a total mass of the alloy, a content of Fe in the alloy that composes the second phase is 1 mass % or more and 20 mass % or less with respect to the total mass of the alloy, a particle size of the alloy is 0.1 to 1000 μm, the content of the alloy that composes the second phase is 5 to 70 mass % with respect to a total content of the metal that composes the first phase and the alloy that composes the second phase, and a grain boundary of the metal is present in the first phase.

3. The preform solder according to claim 2, wherein a content of an intermetallic compound of Sn and Ni in the metal structure is 0 mass % or more and 70 mass % or less with respect to a total mass of the metal structure.

* * * * *